(12) United States Patent
Nangou

(10) Patent No.: US 11,726,194 B2
(45) Date of Patent: Aug. 15, 2023

(54) IMAGING APPARATUS NOT EASILY AFFECTED BY RADIATION, AND IMAGE DISPLAY APPARATUS

(71) Applicant: Norihiro Nangou, Tokyo (JP)

(72) Inventor: Norihiro Nangou, Tokyo (JP)

(73) Assignee: Norihiro Nangou, Tokyo (JP)

( * ) Notice: Subject to any disclaimer, the term of this patent is extended or adjusted under 35 U.S.C. 154(b) by 223 days.

(21) Appl. No.: 17/218,190

(22) Filed: Mar. 31, 2021

(65) Prior Publication Data

US 2021/0239818 A1 Aug. 5, 2021

Related U.S. Application Data

(63) Continuation of application No. PCT/JP2018/047410, filed on Dec. 24, 2018.

(30) Foreign Application Priority Data

Oct. 8, 2018 (JP) .................................. 2018-190555

(51) Int. Cl.
*G06T 7/00* (2017.01)
*G01S 7/52* (2006.01)

(52) U.S. Cl.
CPC ........ *G01S 7/52071* (2013.01); *G06T 7/0004* (2013.01); *G06T 2207/10136* (2013.01)

(58) Field of Classification Search
CPC .... G01S 7/52071; G01S 7/6263; G01S 15/86; G01S 15/93; G01S 15/89; G01S 15/87;

(Continued)

(56) References Cited

U.S. PATENT DOCUMENTS 5,936,240 A 8/1999 Dudar
8,565,860 B2 * 10/2013 Kimchy ................ A61B 6/037
250/363.01

(Continued)

FOREIGN PATENT DOCUMENTS

JP 2003532870 A 11/2003
JP 2010528277 A 8/2010

(Continued)

OTHER PUBLICATIONS

Extended European Search Report for European Patent Application No. 18936389.8 issued by the European Patent Office dated Sep. 24, 2021.

(Continued)

*Primary Examiner* — Sheela C Chawan

(57) ABSTRACT

The present invention is capable of determining the location (s) of waste (e.g. nuclear fuel debris, obstacles, contaminated or otherwise radioactive materials), monitoring and inspecting their surroundings, and transporting them, as well as use in repair, construction, and reactor decommissioning work in high radiation environment. Ultrasound (or sound) waves are not subject to interference from radiation. This modality is utilized in the present invention to detect and image waste and/or objects of interest. The system combines the resulting ultrasound (or sound) wave images for detecting waste and/or objects of interest with radiation information acquired by a radiation detector, to generate and adjust new composite images to display. For example, the image in the direction of strong radiation is red and the image in the direction of weak radiation is blue. Additionally, the constituent imaging apparatus may be fitted on a drone or robotic system for repair and construction work.

8 Claims, 2 Drawing Sheets

(58) Field of Classification Search
CPC ......... G06T 7/0004; G06T 2207/10136; G01T 1/169; G01T 7/00; G01T 1/167; G01T 7/005; G01T 7/12; G21F 1/085; G21F 1/125; Y02E 30/30; G21C 17/08
USPC ....... 382/100, 128, 131, 132, 162, 165, 189, 382/190, 191, 214, 260, 284; 250/394, 250/395, 336.1, 493.1
See application file for complete search history.

(56) References Cited

U.S. PATENT DOCUMENTS

| | | | |
|---|---|---|---|
| 2001/0056234 | A1 | 12/2001 | Weinberg |
| 2002/0053217 | A1* | 5/2002 | Chua ............... F25B 17/083 62/480 |
| 2008/0033300 | A1* | 2/2008 | Hoang ............... A61B 18/20 606/42 |
| 2010/0266171 | A1 | 10/2010 | Wendler |
| 2012/0043471 | A1* | 2/2012 | Harpring ............ G21K 1/025 250/336.1 |
| 2014/0085481 | A1 | 3/2014 | Takahashi |
| 2014/0299784 | A1 | 10/2014 | Kobayashi |
| 2017/0160409 | A1* | 6/2017 | Furuta ............. G01N 33/0055 |
| 2017/0172527 | A1* | 6/2017 | Uber, III ............ A61B 6/481 |

FOREIGN PATENT DOCUMENTS

| | | |
|---|---|---|
| JP | 2014062797 A | 4/2014 |
| JP | 2014215185 A | 11/2014 |
| JP | 2016080529 A | 5/2016 |
| JP | 2016138757 A | 8/2016 |
| KR | 20160051333 A | 5/2016 |
| WO | 0179884 A2 | 10/2001 |
| WO | 2018142172 A1 | 8/2018 |

OTHER PUBLICATIONS

Japan Atomic Energy Agency (JAEA). [Development of a 3D visualization technique for radioactive material using a small lightweight gamma camera: measuring and imaging radiation inside the Fukushima Daiichi Nuclear Power Plant.] In Japanese.https://www.jaea.go.jp/02/press2017/p17091101/ Access date:Jun. 28, 2021.
Office Action issued for counterpart Japanese Application No. 2018-190555, issued by the Japan Patent Office(drafted on Nov. 20, 2018.
(ISA/237) Written Opinion of the International Search Authority for International Patent Application No. PCT/JP2018/047410, issued/mailed by the Japan Patent Office dated Feb. 12, 2019.
Extended European Search Report for European Patent Application No. 17/218190, issued by the European Patent Office dated Sep. 24, 2021.

* cited by examiner

IMAGING APPARATUS NOT EASILY AFFECTED BY RADIATION, AND IMAGE DISPLAY APPARATUS

The contents of the following Japanese patent application are incorporated herein by reference:
NO. 2018-190555 filed in JP on Oct. 8, 2018, and
NO. PCT/JP2018/047410 filed in WO on Dec. 24, 2018.

1. TECHNICAL FIELD

In an image of a device for measuring radiation, for example, areas with strong radiation are red, areas with weak radiation are blue, are integrated, processed and displayed on an image of a device for detecting and imaging objects of interest by ultrasound (or sound) waves. (Red and blue are exemplified, but a color scheme can be different.)

2. RELATED ART

1. Conventional optical cameras (such as photo cameras or video cameras) cannot film for long periods in highly radioactive environments.

2. In order to remove nuclear fuel debris and radiation contaminated materials from the Fukushima and Chernobyl nuclear accident sites, it is necessary to find out where the nuclear fuel debris and radiation contaminated materials are and what condition they are in. Therefore, ideal for this purpose would be a drone or robotic system capable of homing in on sources of intense radioactivity, while detecting and avoiding environmental obstacles. However, the current lack of systems with both of these capabilities has rendered it impossible to remove the nuclear fuel debris and radiation contaminated materials.

3. Similarly, there is a need for surveillance camera systems in nuclear power stations, atomic research centers, and facilities that handle nuclear fuel (before and after use) (including nuclear fuel enrichment, storage, and disposal facilities) even in the absence of an accident, which can monitor reactors and areas where said fuel or radioactive materials (including nuclear fuel and radiation contaminated materials) are present, to counter terrorist acts. Therefore, this has created a need for systems that can visualize conditions near nuclear reactors or nuclear fuel, or near radioactive materials (including nuclear materials, radiation contaminated materials and so on), and display and sense any intruders, further can sense radiation to ensure whether there is a radiation leak or the like. However, no such system has yet been invented.

PRIOR ART DOCUMENTS

Patent Literature

[Patent Reference 1] Published examined patent no. 2014-215185: [A method and device for detecting the location of debris.] In Japanese.

Non Patent Literature

[Non Patent Reference 1] Japan Atomic Energy Agency (JAEA). [Development of a 3D visualization technique for radioactive material using a small lightweight gamma camera: measuring and imaging radiation inside the Fukushima Daiichi Nuclear Power Plant.] In Japanese. https://www.jaea.go.jp/02/press2017/p17091101/

1. Non Patent Ref 1 describes an existing imaging apparatus in which an optical camera is combined with a radiation detector. However, optical cameras have trouble in recording for long periods in highly radioactive environments; moreover, the system described can only measure gamma radiation. Comprehensive radiation monitoring would require a device capable of measuring not only gamma, but also alpha, beta, and X-radiation; unfortunately, no such system has yet been invented. The present invention constitutes a system for visualizing measurement results on an imaging apparatus and radiation detector, suitable for being used across various highly radioactive environments.

2. In order to remove nuclear fuel debris, radiation contaminated materials and radioactive energy substances from the Fukushima and Chernobyl nuclear accident sites, it is necessary to find out where the nuclear fuel debris and radiation contaminated materials are and what condition they are in. Therefore, ideal for this purpose would be a drone or robotic system capable of homing on sources of intense radioactivity to provide a device that can sense the direction where various radiations is strong while detecting and avoiding obstacles, etc. This patent shows it. However, optical cameras have difficulty detecting obstacles in highly radioactive environments. The present invention solves this problem by utilizing an ultrasound (or sound) waves-based device for detecting obstacles (with a radiation detector or other imaging component(s) mounted thereon as described in the above-mentioned 1). (Patent Reference 1 mentions: "The device first shines light on the object of interest, which is reflected on a screen and imaged, determines the location of the fluctuation from the captured image and detects the location of the debris based on the location of the fluctuation." However, there are inherent limitations to this approach: for example, it is unable to detect obstacles; moreover, it cannot detect nuclear fuel debris or objects contaminated by radiation in bright places, and can only operate underwater.) There exist optical cameras and imaging systems with object recognition and auto-focus functionality; but there exist no such devices that employ ultrasound (or sound) wave imaging. Likewise, there exist no multimodal imaging apparatuses that combine ultrasound (or sound) wave imaging for obstacle detection with radiation detection or thermography, with image processing capabilities or various of advanced features (including object recognition, auto-focus, stereographic (3D) image display, etc., if necessary). These deficiencies pose a challenge to efforts to investigate nuclear fuel debris and radiation contaminated materials. The present invention constitutes such a multimodal imaging apparatus, comprising of a device for detecting and imaging waste (e.g. nuclear fuel debris, obstacles, radiation contaminated materials) using ultrasound (or sound) waves integrated with radiation detector and/or thermographic camera, compatible with a broad range of functionalities such as image processing (including object recognition, auto-focus and so on, if necessary), and even stereoscopic (3D) image display.

3. Similarly, there is a need for surveillance camera systems in nuclear power stations, atomic research centers, and facilities or the like that handle nuclear fuel (including nuclear enrichment, storage, and disposal facilities) (before and after use), even in the absence of an accident, which can monitor nuclear reactors and areas where said nuclear fuel or radioactive materials (including nuclear materials and radiation contaminated materials) are present, to counter terrorist acts. Therefore, the present invention constitutes a system that can image the situation near a nuclear reactor or nuclear fuel, or near radioactive materials (including nuclear raw materials, radiation contaminated materials, etc.), and also sense radiation to see if there are any radiation leaks. Also, the proposed system is not limited to surveillance; it can be used to transport nuclear fuel and radioactive materials (e.g. radiation contaminated materials), as well as in inspection, repair, construction, and other operations in the facilities above.

General Disclosure

Ultrasound (or sound) waves are not subject to interference from radiation. This modality is utilized in the present invention to detect and image the object of interest such as waste (e.g. nuclear fuel debris, obstacles, and contaminated or otherwise radioactive material) by ultrasound (or sound) waves. The system is configured to process and display an image that combines the above-mentioned ultrasound (or sound) wave images of detecting waste or the like with radiation information acquired by a sensing radiation detector, to generate new composite images. For example, the image in the direction of strong radiation is red and the image in the direction of weak radiation is blue (red and blue are given as examples, but the color scheme may be different.). In addition, the system is further an integration of a thermographic camera and an imaging apparatus with an image processing function. The present invention further constitutes an imaging apparatus and image display device that includes a variety of supplemental functions as needed (including object recognition, auto-focus, stereoscopic image display and so on as needed). The following situation shows that ultrasound (or sound) wave signals are not affected by radiation interference or effects:

When people have a conversation adjacent to a running electrical appliance, their voices are, in terms of both tone and quality, absolutely identical to how they sound in the absence of any such devices. This means that neither sound nor ultrasound waves will be subject to interference from electrical radiation such as alpha or beta rays.

Similarly, when people have a conversation in an X-ray exam room or other location shielded from ambient radiation, their voices are, in terms of both tone and quality, absolutely identical to how they sound in the presence of normal background radiation. This means that neither sound nor ultrasound waves will be subject to interference from radiation such as alpha, beta, or gamma particles, or X rays.

Whereas ultrasound (or sound) waves depend on a suitable physical medium of air through which to propagate, radiation has no such requirement: it can propagate even in a vacuum without air as a physical medium.

The above principles imply that ultrasound (or sound) waves could be used to detect obstacles and objects of interest alike without concern for the effects or interference of radiation.

One additional merit of ultrasound (or sound) waves-based imaging apparatus is its superior ability to gauge and report distance from objects, compared with optics-based imaging apparatus.

1. The proposed imaging apparatus can be installed on a drone or robotic system, which can be used to locate nuclear fuel debris, radiation contaminated materials, obstacles, or radioactive materials, and become a part of equipment to remove nuclear fuel debris, radiation contaminated materials, obstacles or radioactive materials. Potential applications include surveillance, inspection, repair, and construction operations at nuclear power plants, atomic research centers, or other settings, whether intact or damaged by accidents. The system also has clear utility in the transport of nuclear fuel and radioactive materials, and in the decommissioning of reactors.

2. The proposed system offers beneficial effects in assisting with surveillance, inspection, repair, and construction operations, not only at nuclear power plants and atomic research centers, but also at any location that handles nuclear fuel (including storage sites for unused and spent fuel, and nuclear fuel enrichment facilities) and facilities for disposal of nuclear fuel, as well as in the transport of nuclear fuel and radioactive materials and in the decommissioning of reactors.

3. The proposed system would be useful for exploring the surface of celestial bodies such as stars, planets, satellites, comets in the universe; for searching underwater, underground, in caves, or in highly radioactive areas on planets, satellites, and comets; and for retrieving objects of interest in survey expeditions.

DESCRIPTION OF EXEMPLARY EMBODIMENTS

Figure 1:
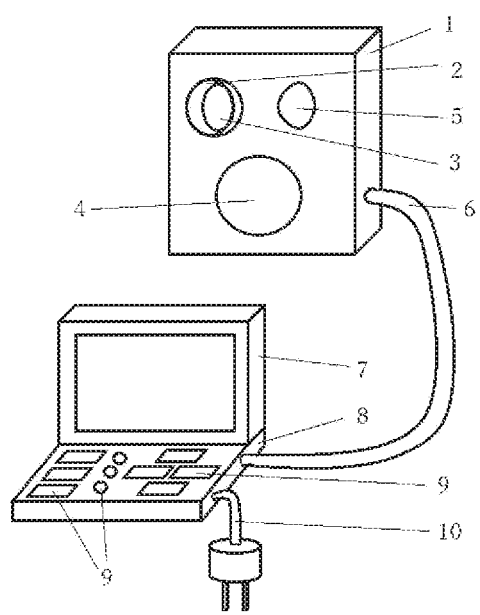
FIG. 1: An imaging apparatus and image display apparatus (perspective view).

Preferred embodiments constitute systems for detecting and imaging obstacles, nuclear fuel debris, etc. using an ultrasound (or sound) wave transmitter: receiver 5 and a radiation detector 4. In the system, electrical components, electric cords and connective wiring are shielded from the effects of radiation by a protective, multi-layer coating (that may be in any number of layers), comprising of a base metal layer (Pb or Au) underneath another layer of high-performance ("HP") material or cord (e.g. HP plastic or HP ceramic). This design allows a drone (or robotic system) mounted with the imaging apparatus to operate even in highly radioactive environments. In one embodiment, the imaging apparatus is mounted on a robot or a drone, which an operator can pilot towards strong radiation sources (e.g. towards nuclear fuel debris) indicated by the imaging apparatus and capture footage of the same.

In order to be able to listen to a person with a high-pitched voice and a low-pitched voice at the same time, different wavelengths of ultrasound (or sound) waves cause less interference, so if the wavelengths of the ultrasound (or sound) waves emitted in front, to the left, to the right, upward, and downward are different, it is possible to detect obstacles and objects of interest in each direction and their distances (by detecting the ultrasound (or sound) waves bouncing back from obstacles) and create three-dimensional images. The ultrasound imaging apparatus may accurately process the information of ultrasound (or sound) waves received from multiple directions and radiation measurements, and possess any of various image processing functions as needed, including (but not limited to): contrast auto-focus, motion-tracking auto-focus, continuous auto-focus, blur correction (i.e. to fix image artifacts due to the motion of the drone flying in air, or the robotic system operating on land, on water, underwater, etc.), image noise reduction (e.g. moire, ghosting, flare correction), stereoscopic or 3D image display, video display, image and video zoom-in and zoom-out display, and contour correction. If feasible, these image correction functions may be performed by AI installed in the repeater 12 or computer 8. Image display functions may include the ability to toggle between still images and videos, to simultaneously display multiple images and videos, and to construct 3D models of the photographed structure interiors ("3D mapping display"). This embodiment is also able to indicate the current location of the robotic system within the constructed 3D maps of the interior of the building photographed. If desired, the device can support 360 or panorama displays incorporating views in every direction simultaneously. The image created by detecting obstacles and objects of interest and their distances using the ultrasound (or sound) waves described above can be displayed by using a device that detects radiation, such as a radiation detector (a Geiger counter or other radiation detector can be combined or rearranged according to the level of radiation and the type of radiation to be targeted). For example, a device that adjusts and displays stereoscopic images so that the image in the direction where radiation comes out strongly is red and the image in the direction where radiation comes out weakly is blue (Red and blue are given as examples, but the color scheme may be different.). If desired, the ultrasound imaging apparatus may additionally be provided with a thermographic camera, and the device shall be able to switch between the screen on which the image taken with ultrasound (or sound) waves and the radiation dose are visualized, integrated, and adjusted, and the screen on which the image taken with ultrasound (or sound) waves and the image taken with thermography are integrated and adjusted, with one switch (or one channel, or one button, etc.). Or, it can display the three-dimensional image of thermography on a separate screen, or display recorded images or videos side by side, or switch between them. If desired, the system can also measure and display humidity. The robotic system can be operated remotely; the use of optical fibers allows it to function normally in environments where high ambient radiation would make electrical wiring infeasible as needed.

If desired, the system can transmit raw or compressed image/video data via email, the Internet, or an intranet, if connected to a network by LAN cable. Applications (software) may be created and incorporated in the system: potential functions include the display of messages, alerts, or evacuation instructions, or the sending of commands to reactor control systems. Via email, Internet, intranet, line connections, or the applications above, the system (or users thereof) can send out warnings (accompanied by temperature, radiation readings, images, etc. if desired) or evacuation instructions; or (instruct reactor control systems to) halt, accelerate, and/or suppress to adjust nuclear reactions inside the reactor core. If desired, the system can be connected to a printer to print out the various types of data and readings mentioned above. There is a high demand for imaging technology that can function in highly radioactive environments, where conventional optical systems cannot film (for long periods of time). Selected settings and applications include (but are not limited to):

(1) Locating waste (e.g. nuclear fuel debris, obstacles, contaminated or otherwise radioactive material), and removing the same, at the site of a nuclear accident.

(2) Surveillance, in-inspection, repair, and construction operations around reactors in normally operating nuclear power plants. ("Surveillance" refers broadly to measures to prevent accidents or terrorism due to intruders or anomalies, damage to or radiation leaks from reactors and other equipment, and the like.) Similarly, it may be used for the transport of nuclear fuel in the same, or during reactor decommissioning work.

(3) The same applications as in (2), in atomic research centers, nuclear fuel enrichment facilities, facilities that store unused or spent fuel, or the like.

(4) Should nuclear energy become feasible to power rockets or other vehicles: the same applications as in (2), for systems related to nuclear energy.

(5) Exploring the surface of celestial bodies such as stars, planets, satellites, comets in the universe; for searching underwater, underground, in caves, or in highly radioactive areas on planets, satellites, and comets; and retrieving objects of interest in survey expeditions.

The above constitutes a selection of potential applications; it should not be interpreted as exclusive.

The embodiments and variations described in [0009] may be infeasible in highly radioactive environments that preclude the use of electrical wiring (even if coated with Au or Pb). In these situations, system components are connected with Au or Pb wiring coated with one layer (or more: see below) of HP material (e.g. HP fiber, HP ceramic), or else optical fibers. If optical fibers are employed, the device is also provided with a signal converter that can convert the light signals they carry into electrical or ultrasound (sound) wave signals, and/or vice versa. Besides the wiring, other elements may also be coated with Pb or Au to protect against the effects of radiation: these elements include the drone (including the aforementioned signal converter), the robotic system (including the aforementioned signal converter) and/or the individual imaging apparatuses therein if desired. Wiring may be coated with a multi-layer coating, comprising of a base metal layer (Pb or Au), covered by any number of HP layer(s) (HP fiber, HP plastic, or other HP material), with as many additional Pb or Au and/or HP layers as desired: there is no upper limit.

The user can pilot the drone or robotic system towards strong radiation directions indicated by the ultrasound imaging apparatus (e.g. towards nuclear fuel debris, or contaminated or otherwise radioactive materials), and capture footage of the same. Embodiments outfitted with optical fibers relay the captured images captured by the imaging apparatus through them, allowing the system to be implemented without any electrical wiring at all if so desired: i.e. sending and receiving captured images, piloting the drone or the robotic system, and other communications are all relayed via optical fibers.

All devices and wiring may be fabricated (or treated) to confer resistance to water, fire, heat, dust, cold, condensation, etc. by utilizing HP materials with corresponding properties (HP ceramics, (HP) heat-resistant materials having various functions, etc. as needed)

For the embodiment depicted in FIG. 1 (a surveillance system), the imaging system 1 may be embedded in a wall, while constituent elements (e.g. ultrasound (or sound) wave transmitter: receiver 5, thermographic camera 2, thermographic measurement unit 3, radiation detector measurement unit 4) may extrude out of it.

Figure 2:
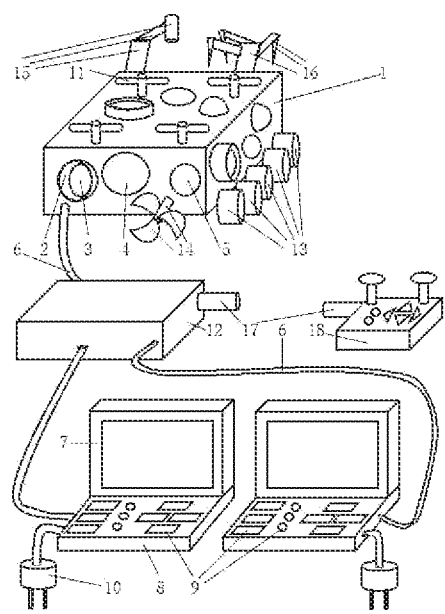
FIG. 2: The imaging apparatus mounted on a robotic system (or a drone) capable of terrestrial, aerial, water-surface, and underwater locomotion, connected to the image display apparatus (perspective view).

For the embodiment depicted in FIG. 2, the repeater 12 may be designed to let out (and reel in) the wiring 6, employing a mechanism that prevents said cable from tangling. If desired, the repeater 12 may be loaded with AI to control the reeling in (and out) of said wiring 6.

Additionally, in the case of FIG. 2, the imaging apparatus may be manufactured out of deformable material or component(s) to allow it to enter and exit even narrow spaces as needed.

EXAMPLES

Two embodiments of the present invention are described below. These examples are non-exhaustive; other embodiments are possible.

FIG. 1 depicts an embodiment of the invention suitable for monitoring use in nuclear power plants, atomic research centers, nuclear fuel storage facilities, and the like. Components are connected with Pb- or Au-coated electrical wires or optical fibers. In the latter case, the embodiment shall include elements for converting photonic signals carried by the optical fibers into ultrasound (or sound) waves or electrical signals, and/or converting ultrasound (or sound) waves or electrical signals into photonic signals, to be sent and received along said fibers. Device components are connected using electrical wires coated with Pb or Au, or else optical fibers (coated with Pb or Au if desired). If desired, this layer may be covered with additional HP layer(s) (HP fibers, HP plastics, etc. as desired). Additional Pb or Au and/or HP layers (HP fibers, HP plastics, etc. as desired) may be added as desired; there is no upper limit to the multi-layer structure. If desired, the device can be manufactured to run entirely without electrical wires, by connecting components alternatively using optical fibers (with a multi-layer coating, as described above, if desired). If desired, the device can also be provided with a thermographic camera; using a switch (or channel, or button, etc.), users can toggle the display between thermography view and radiation dose view, or display them simultaneously. The device may be loaded with a variety of image processing functions, zooming in and out of images or videos, and displaying recorded or video images and videos in parallel or switching between them at the same time, if desired. If desired, the device may be connected to the Internet or an intranet, and/or send and receive emails, and/or send warnings, and/or send commands to a reactor (or other) control system. If used as a surveillance system (FIG. 1), the imaging system 1 may be embedded in a wall, while other components (e.g. ultrasound (or sound) wave transmitter: receiver 5, thermographic measurement unit 3, radiation detector measurement unit 4) extrude out of it. Alternatively, the imaging system 1 may be hung on the wall, or installed in other conditions. FIG. 1 depicts only a single monitor 7 and a single computer 8; however, additional monitors and computers may be installed as spares. Similarly, a spare imaging system could be connected to the computer 8 via a separate wiring 6. This spare imaging system needs not to be a duplicate of the primary imaging system 1: for example, the mobile imaging system 1 depicted in FIG. 2 may be utilized instead. All components and wiring may be fabricated (or treated) to confer resistance to water, fire, heat, dust, cold, electrical leakage, low temperature, etc. by utilizing HP materials with corresponding properties (HP plastics, HP ceramics, etc.) as needed.

FIG. 2 depicts an embodiment of the system designed for investigating e.g. nuclear fuel debris at the site of a nuclear accident. As in FIG. 1, the wiring has a mono or multi-layer protective coating. If optical fibers are employed, the drone or the robotic system is configured to accommodate the imaging apparatus includes elements for converting photonic signals carried by the fibers into ultrasound (sound) waves or electrical signals, and/or converting ultrasound (sound) waves or electrical signals into photonic signals, to be sent and received along said fibers. Similarly, the drone or the robotic system may be coated in Pb or Au as well, if desired. If desired, the device can also be provided with a thermographic camera; using a switch (or channel, or button, etc.), users can toggle the display between thermography view and radiation-dose view, or display them simultaneously. Similarly, the system may allow users to display live footage alongside previously recorded footage or audio or video, or toggle between live and saved footage/audio/video, if desired. If desired, all components and wiring can be manufactured to run entirely without electrical wires, by connecting components alternatively using optical fibers (with a multi-layer protective coating). All components and wiring 6, including the robotic system or the drone, may be fabricated (or treated) to confer resistance to water, fire, heat, dust, cold, electrical leakage, low temperature, etc. by utilizing HP materials with corresponding properties (HP plastics, HP ceramics, etc.). Additionally, the robotic system or the drone or the imaging system etc. may be manufactured out of deformable material or component(s) to allow it to enter and exit even narrow spaces as needed.

Some details about the two examples depicted in FIGS. 1 and 2 bear mentioning. The system is configured to process and display an image with radiation information acquired by a radiation detector, to generate new composite images. For example, the image in the direction of strong radiation is red and the image in the direction of weak radiation is blue (red and blue are given as examples, but the color scheme may be different.). The device shall combine the image of the obstacle or object of interest detected by ultrasound (or sound) waves with the image of the intensity of radiation and display it, and adjust the image, etc. so that the image of the obstacle or object of interest detected by ultrasound (or sound) waves is not disturbed.

If desired, the device can also be provided with a thermographic camera; using a switch (or channel, or button, etc.), users can toggle between composite ultrasound (or sound) wave radioactivity and ultrasound (or sound) wave thermography images, or display them simultaneously. Similarly, the device may allow users to display live footage alongside previously recorded footage or audio or video, or toggle between live and saved footage/audio/video.

To protect them from electromagnetic interference due to radiation, any of the device's electronic components may be coated with Pb or Au. If needed, this layer may be covered with additional HP layer(s) (HP plastics, HP ceramics, etc. as desired). Additional Pb or Au and/or HP layers may be added as desired; there is no upper limit to the multi-layer structure. Likewise, each component may be fabricated or treated to confer resistance to water, fire, heat, dust, cold, electric leakage and/or low temperature. The embodiments depicted in FIGS. 1 and 2 are not limited to the applications and variations described; additional applications and variations are possible.

Detailed descriptions and variations of all elements shown in FIGS. 1 and 2 are given below. Applications of the present invention are not limited to the examples below; additional applications and variations are possible.

1. Imaging system. This element is depicted as a rectangular solid in FIGS. 1 and 2, but other shapes are possible (cubic, spherical, polyhedral, etc.) Brackets to fasten the device to a wall may be affixed to on the element's rear, top, or side face(s). Imaging system 1 may be coated with a protective coating: this may comprise of mono layer of Pb or Au, or a bilayer comprising of such a layer coated by an additional layer of HP material (HP ceramics, HP plastics, etc.), or any multi-layer coating comprising of multiple Pb or Au and/or HP layers (there is no upper limit to the number of layers). Internal wiring may comprise of: naked electrical wires (coated with HP ceramics, HP fibers, etc.) or optical fibers; the same coated with a mono layer of Pb or Au; the same coated with additional layer(s) of HP material (HP fibers, HP ceramics, etc. as desired) as needed. (There is no upper limit to the number of layers). If optical fibers are employed, the imaging system may also accommodate elements for converting photonic signals into electrical signals and/or ultrasound (or sound) wave signals, and/or elements for converting electrical and/or ultrasound (or sound) wave signals into photonic signals. The imaging system may be connected to other components using the wiring 6 as needed. If desired, the imaging system may possess extended functions such as object recognition, motion detection, auto-focus (including motion-tracking auto-focus, if desired), and/or time lapse recording. If desired, the imaging system may be provided with a directional microphone to pick up audio in the audible range, and/or possess the ability to automatically focus on the source of any loud noises detected and record audio/footage in said direction, and send this information via the wiring 6 to the monitor 7 and computer 8 for playback. If desired, the imaging system may also be provided with equipment for measuring humidity, and relay this information to the computer 8 or repeater 12 to be displayed on the monitor 7 through the wiring 6. For example, this element may be fabricated or treated using HP material (HP plastics, HP ceramics, etc.) to confer resistance to dust and/or (as needed) water, fire, heat, cold, electrical leakage, condensation, low temperature, etc.

2. Thermographic camera. This element's shape need not be the same shape as in the examples depicted in FIGS. 1 and 2. (In FIG. 2, one thermographic camera is depicted on each face of the imaging system 1; however, the design can accommodate more or fewer such units per face, including multiple such cameras on a single face.) The camera may be covered with a filter that allows only infrared light to pass through (to improve the accuracy of the thermographic camera). For example, this element may be fabricated or treated using HP material (HP plastics, HP ceramics, etc.) to confer resistance to dust and/or (as needed) water, fire, heat, cold, electrical leakage, condensation, low temperature, etc. This element is non-essential to the invention; it can be omitted if desired.

3. Thermographic measurement unit. This element is configured to measure infrared radiation. (If necessary, this element may include LEDs or other sources of infrared light for irradiation). This element may be connected to other components using wiring 6. This element's shape need not be the same shape as in the examples depicted in FIGS. 1 and 2. In FIG. 2, one thermographic measurement unit is depicted on each face of the imaging system 1; however, the design can accommodate more or fewer such units per face, including multiple such measurement units on a single face. To protect them from the effects of radiation, precision components may be coated with a mono layer of Pb or Au, or a bilayer comprising of such a layer coated by an additional layer of HP material (HP plastics, HP ceramics, etc.), or a multi-layer coating comprising of any number of Pb or Au and/or HP layers. (There is no limit to the number of layers). If desired, this element may possess extended functions such as object recognition, motion detection, auto-focus (including motion-tracking auto-focus), time lapse recording, and/or zoom photography. For example, this element may be fabricated or treated using HP material (HP plastics, HP ceramics, etc.) to confer resistance to dust and/or (as needed) water, fire, heat, cold, electrical leakage, condensation, low temperature, etc. This element is non-essential to the invention; it can be omitted if desired.

4. Radiation detector measurement unit. (This element is depicted as circular in FIGS. 1 and 2, but other shapes are possible.) In FIG. 2, one element is shown on each side, but the number may be increased or decreased, e.g. by installing several on each side. It is preferable to use a combination of several radiation detectors, such as a Geiger counter and a scintillator or an x-ray analyzer. This element may be connected to other components using the wiring 6. To protect them from the effect of radiation, precision components may be coated with a mono layer of Pb or Au, or a bilayer comprising of such a layer coated by an additional layer of HP material (HP plastics, HP ceramics, etc.), or a multi-layer coating comprising of any number of Pb or Au and/or HP layers. (There is no limit to the number of layers). If desired, this element may possess extended functions such as object recognition, motion detection, auto-focus (including motion-tracking auto-focus), time lapse recording, and/or zoom photography. For example, this element may be fabricated or treated using HP material (HP plastics, HP ceramics, etc.) to confer resistance to dust and/or (as needed) water, fire, heat, cold, electrical leakage, condensation, low temperature, etc.

5. Ultrasound (or sound) wave transmitter-receiver. (This element is depicted as hemispherical in FIGS. 1 and 2; but other shapes are possible. This element may be a transmitter and receiver combined with a sound collection microphone or other component to extend its functionality, if desired. FIG. 2 shows one on each side, but the number may be increased or decreased, e.g. by installing several on each side.) This element may be connected to other components using the wiring 6. To protect them from the effect of radiation, precision components may be coated with a mono layer of Pb or Au, or a bilayer comprising of such a layer coated by an additional layer of HP material (HP plastics, HP ceramics, etc.), or a multi-layer coating comprising of any number of Pb or Au and/or HP layers. (There is no limit to the number of layers). If desired, this element may possess extended functions such as object recognition, motion detection, auto-focus (including motion-tracking auto-focus), time lapse recording, and/or zoom photography. In this case, this element could be used to pick up audio in the audible range, and/or possess the ability to automatically focus on the source of any loud noises detected, and send the recorded audiovisual information via the relay cable 6 to the monitor 7 or computer 8 for playback. For example, this element may be fabricated or treated using HP material (HP plastics, HP ceramics, etc.) to confer resistance to dust and/or (as needed) water, fire, heat, cold, electrical leakage, condensation, low temperature, etc.

6. Wiring. (This element may be an electrical cable; or Pb or Au wire with an additional layer of coating (composed of e.g. (HP) fiber, (HP) plastic, or other material as desired); or an optical fiber. Regardless of composition, this element could be given any number of additional layers of coating to create a multi-layer coating: e.g., metal layer(s) of Pb or Au, followed by layer(s) of HP material (HP fibers, HP ceramics, etc.): there is no upper limit to the number of layers. The cable's length can be adjusted according to the usage setting, from the order of centimeters, to hundreds of meters, to several kilometers or more. For example, such HP materials might include some combination of waterproof, heat-resistant, flame-retardant, etc. fibers or other materials incorporated into said coating, to confer resistance to dust and/or (as needed) water, fire, heat, cold, electrical leakage, condensation, low temperature, etc. (Coating may incorporate HP plastics, HP ceramics, or other (HP) materials; or some combination thereof.)

7. Monitor. (FIGS. 1 and 2 depict a typical (personal) computer monitor 7, but other forms and types of the monitor 7 are possible. For example, this element may be installed in, or on the wall(s) of a control or security room. LCD, organic EL, or cathode ray tube displays may be used instead of a computer monitor. The display is depicted as a rectangular screen in FIGS. 1 and 2, but other shapes are possible (e.g. square). Monitor can be used to display stereoscopic 3D image display of compatible images and videos. If desired, the monitor may support the dual display of composite images: a combined ultrasound (or sound) wave image (video) and a radiation dose image (video) on one half of the monitor screen, and a combined ultrasound (or sound) wave image (video) and a thermography image (video) on the next half of the monitor screen, with both combined images (videos) displayed simultaneously. The monitor 7 may display either a composite image (video) of the ultrasound (or sound) wave image (video) and the radiation dose image (video), or a composite image (video) of the ultrasound (or sound) wave image (video) and the thermography image (video), and switch the display to another composite image (video) with a key button. Alternatively or additionally, the monitor supports in which one composite image (video) to be enlarged from the state in which both composite images (videos) are displayed by pressing the key button 9 (displaying zoomed shooting), or in which another composite image (video) is enlarged by further pressing the key button. The monitor may also support tracing (i.e., a feature allowing a user to draw a red circle around objects/locations of interest in footage), and/or display the current time; and/or (if the computer 8 and/or the repeater 12 are battery-powered) display the remaining battery life. The monitor may also support enlarged (zoom) and/or reduced (thumbnail) images (videos), selected using the key button 9. If desired, using the key button, the system can: toggle the image (video) between forward and lateral (left, right) views; display wide-angle image (video) (i.e. merged forward-left-right view, or forward-upward-downward view, evoking a fisheye lens; view angle may exceed 180°); display 360° or panorama views of the image (video); toggle between (or simultaneously display) rear and upward and downward views of the image (video); save audiovisual footage; display live image (video) alongside saved image (video) (with playback options including slow-motion, fast-forward, rewind, etc.); toggle the image (video); and display humidity. Monitor may also be able to reduce the image (video) noise while displaying. Alternatively or additionally, monitor may utilize a touchscreen to allow the user to perform the various operations above (without using the key button 9). If desired, the monitor 7 (or the computer 8) may be used to playback audio in the audible range (e.g. of anomalies, intruders, or explosions) captured by the imaging system 1 and received via the wiring 6. For example, this element may be fabricated or treated using HP material (HP plastics, HP ceramics, etc.) to confer resistance to dust and/or (as needed) water, fire, heat, cold, electrical leakage, condensation, low temperature, etc. If desired, the system may be configured to allow the user to activate any of the above functions, and/or object recognition, motion tracking, auto-focus (including motion-tracking and/or continuous auto-focus), and/or time lapse recording, via the key button 9, the controller 18, or the monitor in a case of a touchscreen. The monitor 7 may be omitted from the system if the computer 8 instead displays footage by means of a projector without using the monitor 7.

Detailed descriptions and potential variations of all elements shown in FIGS. 1 and 2 are given below. Applications of the present invention are not limited to the examples below; additional applications and variations are possible.

8. Computer. (This element can create composite footage from the ultrasound (sound) waves, and/or radiation measurement data, and/or thermography data received via the wiring 6; reduce noise in footage; and sound an alarm and send warnings. Moreover, it supports user input from the key button 9. FIGS. 1 and 2 depict a typical personal computer ("PC"), but other forms and types are possible.) This element may be installed (e.g. embedded in a wall) in a control room, security room, or other indoor settings. If desired, a suitable computer may be chosen that supports all typical PC peripherals (mouse, USB memory stick, projector, etc.). If desired, the computer can be connected to a network by LAN cable, to permit email transmission, or connection to the Internet. Applications (software) may be created and incorporated in the system: potential functions include the display of messages, alerts, or evacuation instructions, or to send commands to reactor control systems. Via email, the Internet, line connections, or the applications above, the system (or users thereof) can send out warnings (accompanied by temperature, humidity, and/or radiation dose readings, and/or images, etc. if desired), and/or evacuation instructions; and/or (instruct reactor control systems to) halt, accelerate, and/or suppress nuclear reactions inside the reactor core. The computer can be connected to a printer to print out the various types of data and reading mentioned above (with an accompanying timestamp if desired). Additionally, the object recognition, auto-focus, motion detection, motion-tracking and/or continuous autofocus, and/or time lapse recording functions may be calibrated to target objects that are highly radioactive, and/or hot, and/or cold. If feasible, the computer may allow the user to command the imaging system to auto-focus on certain objects using the key button 9. If feasible, an auto-save function could be installed to automatically save visual (images/videos) and audio (sound in audible range) data. (Said data may be stored in the cloud). If desired, the computer 8 (or monitor 7) may be used to playback audio in the audible range (e.g. of anomalies, intruders, or explosions) captured by the imaging system 1 and received by the computer 8 or monitor 7 via the wiring 6. If desired, the computer 8 can be configured to print out certain information: e.g. images, radiation doses, temperature (estimated by thermographic camera), current date/timestamp, and/or humidity. The computer may be operated via the monitor 7 (if touchscreen-enabled), the key button 9, and/or the controller 18. Optionally, the computer 8 (or the repeater 12) may be loaded with AI to automatically make optimized decisions related to commands sent (and operations performed) by the system to perform functions (the functions adaptable to AI assistance could include, but are not limited to: object recognition; auto-focus; contrast auto-focus; motion detection; motion-tracking auto-focus; continuous auto-focus; self-timer; blur correction; moire/ghosting/flare correction; image/video data compression; time lapse recording; video display; enlarged (zoom) and reduced (thumbnail) displays of footage; image (video) noise reduction; contour correction; toggling between (static) images and videos; simultaneous display of multiple images and videos (including of saved audiovisual data: with slow-motion, fast-forward, rewind functionalities); constructing three-dimensional models of structure interiors (3D mapping); displaying the device's current location; abnormality recognition and verification; sending warnings; stopping reactors; adjusting reactor operations; displaying humidity; engaging the (aerial) propeller(s) 11, wheel(s) 13, and/or screw propeller(s) 14 to move the imaging system; cutting/crushing targets using a cutting/crushing tool 15; retrieving items using the robotic arm 16; and/or printing out data from the computer 8 or printer.) If desired, the computer may be powered by means of battery (or batteries), solar cell(s), and/or private generator(s). For example, this element may be fabricated or treated using HP material (HP plastics, HP ceramics, etc.) to confer resistance to dust and/or (as needed) water, fire, heat, cold, electrical leakage, condensation, low temperature, etc.

9. Key button. The key button 9 may be used to power on and off the computer 8, the monitor 7, the robotic system or the drone, the imaging system 1, and/or the repeater 12. Likewise, it is used to send various commands to the computer 8, detailed in the previous paragraph. The monitor 7 functions that can be operated by the key button 9 input include (but are not limited to): displaying composite footage (e.g. ultrasound (or sound) wave radiography, or ultrasound (or sound) wave thermography); toggling between the same; toggle (or simultaneously display) forward, left, right, rear, upward, and/or downward views, or panorama views in which these are merged (evoking a fisheye lens); enlarged (zoom) and/or reduced (thumbnail) views; dual display of composite images, simultaneous (or toggled) display of live footage with saved footage (with image and video playback options including slow-motion, fast-forward, rewind, etc.). If desired, the key button may be used to display humidity information, sound and send warnings (accompanied by images or readings of temperature, dose, humidity, anomalies, intruders, etc.), or evacuation instructions, and/or (instruct reactor control systems to) halt, accelerate, and/or suppress nuclear reactions inside the reactor core. Similarly, the key button can be used to control the robotic system, instructing it to move forward and backward, up and down, and turn left or right, as well as the cutting/crushing tool 15 (including laser direction and focal length) and the robotic arm 16. If desired, the key button may be used to instruct the imaging system 1 or ultrasound (or sound) wave transmitter-receiver 5 to capture sound in the audible range, and send it via the relay cable 6 to the monitor 7 or computer 8 for playback. The key button 9 may possess any number of keys, as desired. Additionally, the key button 9 can be used to configure a variety of settings on the computer 8. (Examples include: if the amount of radiation detected by the radiation detector 4 exceeds a certain threshold, automatically sounding warnings, sending warnings (along with aforementioned data and images, if desired), sending evacuation instructions, and/or (instructing reactor control systems to) halt, accelerate, and/or suppress nuclear reactions inside the reactor core. And/or if the thermographic measurement unit 3 measures temperature above a certain threshold, and/or if the imaging system 1 measures humidity above a certain threshold, automatically sounding warnings, sending warnings (along with aforementioned data and images, if desired), sending evacuation instructions, and/or (instructing reactor control systems to) halt, accelerate, and/or suppress nuclear reactions inside the reactor core. And/or if the ultrasound transmitter-receiver 5 detects an anomaly (intruder, etc.), automatically sounding alarms, transmitting warnings (including information and images as required), issuing evacuation instructions (to the equipment controlling the reactor) and instructing the operator to stop the nuclear reaction, adjusting propulsion or suppression, etc. Default or preferred actions to take based on radiation dose, temperature, humidity, and/or in the event of an anomaly can be configured at the same time. Of course, it is also possible to set the aforementioned settings for the radiation dose, the aforementioned settings for the temperature sensed by the thermography, the settings for when the ultrasound (or sound) wave transmitter/receiver 5 detects an anomaly and the settings for the humidity at the same time. The key button 9 may also support a tracing function (i.e., a feature allowing a user to draw a red circle around anomalies in footage). If desired, a key button 9 may be installed on the repeater 12, allowing a user to give the commands above from it directly. For example, this element may be fabricated or treated using HP material (HP plastics, HP ceramics, etc.) to confer resistance to dust and/or (as needed) water, fire, heat, cold, electrical leakage, condensation, low temperature, etc. FIGS. 1 and 2 display this element as a key button 9 interface, but other input devices are possible: e.g. mouse (computer peripheral) or controller 18 such as for video game consoles. This element may be omitted from the system if unnecessary: for example, if the system supports voice commands, or if a controller 18 is attached.

10. Power cable. (FIGS. 1 and 2 depict a two-pronged electric plug, standard in Japan, but other types are possible, such as a three-pronged (grounded) plug. Optionally, power cable may connect to (or incorporate) a voltage transformer, AC/DC converter, etc. as needed.) This element may be fabricated or treated using HP material (HP plastics, HP fibers, etc.) to confer resistance to dust and/or (as needed) water, fire, heat, cold, electrical leakage, condensation, low temperature, etc. This element may be omitted from the system if unnecessary: for example, if the computer 8 is powered by battery (including rechargeable batteries and solar cells) or generator.

Detailed descriptions and potential variations of all elements shown in FIGS. 1 and 2 are given below. Applications of the present invention are not limited to the examples below; additional applications and variations are possible.

11. Propeller. (FIG. 2 depicts several propellers 11 fitted on a drone; however, they could be installed on a robotic system. For example, they could be provided to a terrestrial robot to give it flight capabilities. In the embodiment in FIG. 2, four such propellers are installed on a drone in the shape of a rectangular solid; however, the said system may be in the shape of a cylinder, a polygonal solid, etc., and more or fewer propellers may be utilized as desired. FIG. 2 depicts this element as an aerial propeller 11; however, other sources of propulsion (e.g. rocket engine, aircraft engine) may be utilized instead or in combination (e.g. propellers plus rocket). Multiple propellers and/or non-propeller components may be installed in tandem. For example, this element may be fabricated or treated using HP material (HP plastics, HP ceramics, etc.) to confer resistance to dust and/or (as needed) water, fire, heat, cold, electrical leakage, condensation, low temperature, etc. This element (and the non-propeller propulsion devices described above) may be omitted from the system if unnecessary.

12. Repeater. (This element may be used to create composite ultrasound (or sound) waves/radiation/thermographic images from captured footage. The repeater 12 may convert electrical signals received from the computer 8 into photonic signals to send to the imaging system 1 or other remote elements via the wiring 6, and/or convert photonic signals received from the imaging system 1 or other remote elements into electrical signals to send to the computer 8 or other local elements via the wiring 6. FIG. 2 depicts this element as a rectangular solid, but other shapes are possible. The repeater may be provided with a key button 9, to allow a user to perform some or all of the instructions described in the subsection "9. Key button" from it directly. For example, this element may be fabricated or treated using HP material (HP plastics, HP ceramics, etc.) to confer resistance to dust and/or (as needed) water, fire, heat, cold, electrical leakage, condensation, low temperature, etc. Under e.g. highly radioactive conditions where contamination makes it impossible to re-use the equipment (wiring 6 connecting the imaging system 1 from the repeater 12, the imaging system 1 and other equipment), dispose of equipment and tools ahead of the repeater 12 and connect new (or improved) equipment and tools to the repeater 12, so that equipment behind the repeater 12 (such as the repeater 12, the wiring 6 connecting the repeater 12 to the computer 8, the monitor 7, the key button 9 and the power cable 10) can be used repeatedly. Optionally, the repeater 12 may be powered by a battery (including rechargeable batteries and solar cells) or a generator. Optionally, the repeater 12 (or the aforementioned computer 8) may be loaded with AI to automatically make optimized decisions related to commands sent (and operations performed) by the system. (Functions adaptable to AI assistance may include, but are not limited to: object recognition; auto-focus; contrast auto-focus; motion detection; motion-tracking auto-focus; continuous auto-focus; self-timer; time lapse recording; blur correction of the imaging system 1 (including the ability to fix image artifacts due to the motion/shaking of the robotic system in air, on land, on water, underwater, etc.); moire/ghosting/flare correction; image/video data compression; video display; enlarged (zoom) and reduced (thumbnail) displays of footage; noise reduction of footage; contour correction; toggling between (static) images and videos; simultaneous display of multiple images; 3D mapping of photographed structure interiors; current location display; abnormality recognition and verification; sending warnings (accompanied by various readings if desired); stopping reactors; adjusting reactor operations; cutting/crushing targets using the cutting/crushing tool 15; retrieving items using the robotic arm 16; and/or printing out data from a printer if connected.)

Alternatively or additionally, the repeater 12 may be controlled directly by voice commands. The repeater 12 may contain an apparatus for letting out and reeling in the wiring 6, employing a mechanism that prevents said wiring 6 from tangling. If desired, the repeater 12 may be loaded with AI to control the reeling in (and out) of said wiring 6. This element may be omitted from the system if unnecessary: in this case, the imaging system 1 is connected directly to the computer 8 via the relay cable 6.

13. Wheels. For embodiments such as depicted in FIG. 2, in which wheels 13 are arranged in several (left-right) rows and (front-rear) columns, the first row may be positioned higher than the other rows to assist with climbing through difficult terrain. Spiked tires may be used as this element for the foremost row, rearmost row, or all rows as desired. FIG. 2 illustrates a tire wheel 13, but it can also be a caterpillar. Multiple caterpillars are also possible, for example, caterpillars on the two front tires and another caterpillar on the three rear tires. The embodiment in FIG. 2 shows two columns of five wheels each (10 total); however, more or fewer are possible. Wheels need not be the same size: multi-size designs may be employed to better traverse rough terrain. Similarly, all-wheel drive and/or anti-lock braking may be incorporated as desired. Alternatively or additionally, magnetic wheels 13 may be adopted to allow the robotic system to move vertically up and down metal columns and/or walls. Each wheel 13 can be moved up and down to match the rough terrain (rocky, etc.) so that the wheel 13 can be rotated to match the rocky or other surface, or (although wheels 13 are installed on only two surfaces in FIG. 2) wheels 13 can be installed on many more surfaces (more than one if necessary). Wheels 13 may be replaced with robotic legs to change the robotic system's mode of terrestrial locomotion from wheeled mode to walking mode. For example, this element may be fabricated or treated using HP material (HP plastics, HP ceramics, etc.) to confer resistance to dust and/or (as needed) water, fire, heat, cold, electrical leakage, condensation, low temperature, etc. This element (along with variations such as caterpillars, robotic legs, etc.) may be omitted from the system if unnecessary.

14. Screw propeller. (For underwater or water-surface locomotion.) FIG. 2 depicts one such propeller on one face of the robotic system, but multiple screws on multiple (or all) faces is possible. For example, this element may be fabricated or treated using HP material (HP plastics, HP ceramics, etc.) to confer resistance to dust and/or (as needed) resistance to water, fire, heat, cold, electrical leakage, condensation, low temperature, etc. FIG. 2 depicts a screw propeller 14, but other devices for underwater or water-surface propulsion may be employed. This element (or similar elements for underwater and/or water-surface propulsion) can be omitted from the system if unnecessary.

15. Cutting/crushing tool. This element is for cutting (and/or crushing, breaking, etc.) environmental obstacles: these may include metal plates, concrete, reinforced concrete, wooden boards, fuel debris, obstacles, wastes, etc. FIG. 2 depicts a laser cutting device, which includes a component for converting electrical energy into a laser (light) energy. Laser's direction, focal point, and intensity can be controlled by key button 9 or controller 18; alternatively, AI in the computer 8 or repeater 12 can modulate these parameters automatically. Laser-based cutting is given as an example: the element may cut using other technologies (waterjet, diamond blade, etc.); moreover, the device may house multiple laser- or alternative cutting tools when needed. The cutting tool may be installed on a surface perpendicular to the direction of travel of the wheel 13 to improve stability, etc., or it may be installed on several surfaces (several cutting devices may be installed on each surface). Alternatively, this element may constitute a crushing tool instead of a cutting tool. For example, such a crushing tool would employ ultrasound (or sound) waves to crush or break fuel debris, obstacles, or other waste, or a drilling tool. Similarly, such a crushing tool (or multiple ones) could be equipped on multiple faces, and/or used in tandem with a cutting device(s). For example, this element may be fabricated or treated using HP material (HP plastics, HP ceramics, etc.) to confer resistance to dust and/or (as needed) water, fire, heat, cold, electrical leakage, condensation, low temperature, etc. If desired, boric acid or water, or boric acid water, shall be discharged simultaneously to prevent criticality. Alternatively, a high-pressure water-based cutting/crushing tool may use boric acid as the medium. This element may be omitted from the system if unnecessary.

16. Robotic arm. This element is for the retrieval or manipulation of objects that have been cut or crushed by the cutting/crushing tool 15, have fallen down or sunk underwater, and/or are floating on water surfaces, or suspended in the air, or otherwise need retrieval, for example, for capturing wastes such as nuclear fuel debris, obstructions, and radiation-contaminated materials, and their cut or crushed materials. FIG. 2 depicts one such arm 16, but multiple arms 16 may be installed as desired. Similarly, the arm depicted in FIG. 2 has three fingers, but more or fewer are possible. FIG. 2 depicts a hydraulic arm, but other modalities are possible. It is also possible to have several arms 16 (retrieving device), each powered separately, for example by installing one arm 16 powered by water pressure and another arm 16 powered by photonic signals. The arm 16 may be installed on a surface perpendicular to the direction of travel of the wheel 13 to improve stability etc., or a plurality of arms 16 may be installed on several surfaces (several arms 16 on each surface). Retrieval or manipulation tools other than a robotic arm 16 are possible: if these are used, they may be installed under the above conditions (either on the surface in the direction of travel of the wheel 13, or on a vertical surface, or multiple installations on multiple surfaces, etc.). Robotic arm(s) 16 can be combined with these other, non-arm retrieval or manipulation tools, on multiple faces. For example, this element may be fabricated or treated using HP material (HP plastics, HP ceramics, etc.) to confer resistance to dust and/or (as needed) water, fire, heat, cold, electrical leakage, condensation, low temperature, etc. This element is non-essential; it can be omitted if desired.

17. Communication device. This element may utilize wireless (Wi-Fi (registered trademark)) communication. This element can send input from the controller 18 to the imaging system 1 via the repeater 12. This element may be fabricated or treated using HP materials (HP plastics, HP ceramics, etc.) to confer resistance to fire, water, heat, dust, cold, condensation, electrical leakage, low temperature, etc. as needed. Alternatively, this element's role can be fulfilled by the wiring 6. This element can be omitted if unnecessary: for example, if the computer 8 can send commands directly to the imaging system 1.

18. Controller. This element provides a joystick- and/or a key button 9 based input device used to operate the imaging system 1 and so on via the communication device 17 or the repeater 12. The controller 18 can be used to perform some or all of the instructions described in the paragraphs written in the subsection "9. Key button" as needed. This element may be fabricated or treated using HP materials (HP plastics, HP ceramics, etc.) to confer resistance to fire, water, heat, dust, cold, condensation, electrical leakage, low temperature, etc. as needed. This element can be omitted if unnecessary: for example, if the computer 8 can send commands directly to the imaging system 1.

INDUSTRIAL APPLICABILITY

The technology has several potential applications, all of which have high industrial and commercial utility. There is a high demand for imaging technology that can function in highly radioactive environments, where conventional optical systems are infeasible (for long periods of time), as illustrated in the examples below.

(1) Locating waste e.g. nuclear fuel debris, obstacles, contaminated or otherwise radioactive material, and clearing the same, at the site of a nuclear accident.

(2) Surveillance, inspection, repair, and construction operations around reactors or nuclear fuel, and/or reactor decommissioning work, and/or the transport of nuclear fuel (or contaminated or otherwise radioactive material) in normally operating nuclear power plants.

(3) Surveillance, inspection, repair, and construction operations, and/or reactor decommissioning work, and/or the transport of nuclear fuel (or contaminated or otherwise radioactive material) in atomic research centers and facilities that handle nuclear fuel before and after use (e.g. enrichment, storage, and disposal facilities).

(4) Should nuclear energy become feasible to power rockets or other vehicles in the universe (e.g. in outer space): surveillance, inspection, repair, and construction of nuclear equipment (e.g. fuel storage units, reactor cores, injection units), and/or reactor decommission, and/or the transport of nuclear fuel (or contaminated or otherwise radioactive material) in such vehicles.

(5) There is demand for systems capable of exploring the surface of celestial bodies such as stars, planets, satellites, comets, etc. in the universe; for searching underwater, underground, in caves, or in highly radioactive areas on planets, satellites, and comets; and retrieving objects of interest in survey expeditions.

The above constitute examples of potential applications; usages other than these may exist.

What is claimed is:

1. An imaging apparatus and image display apparatus, comprising: an imaging apparatus, capable of sending and receiving ultrasound or sound waves of different frequencies in a direction where an image or a video is needed; a radiation imaging apparatus, capable of color-coding radiation intensity in the direction by a radiation detector; a display apparatus, capable of integrating and processing an image of the imaging apparatus and the radiation imaging apparatus, and then displaying the image; and wiring; wherein: the wiring, the imaging apparatus and the radiation imaging apparatus are protected from radiation by a mono or multi-layered coating, comprising of a metal layer composed of Pb or Au, and an insulating layer coated above the metal layer, to confer resistance to at least one of following hazards: dust, fire, electrical leakage, heat, cold, water, and condensation, and are disposable; and the display apparatus, which is configured to process an image and display an image and a video, based on ultrasound or sound waves received from a plurality of directions and measured radiation intensity, is characterized by being able to be used longer or more frequently than an imaging apparatus and a radiation imaging apparatus, by being able to be used in isolation from a site where radiation is emitted.

2. The imaging apparatus and image display apparatus described in claim 1, wherein: the wiring, the imaging apparatus, and the radiation imaging apparatus exposed to radiation are wired with optical fibers, and further comprising a converter, wherein the converter is at least one of a converter for converting optical fiber light energy into electrical energy, a converter for converting light energy into ultrasonic or sonic energy, a converter for converting ultrasonic or sonic energy into light energy, and a converter for converting electrical energy into light energy; and the optical fibers and the converter have a mono or multi-layered coating comprising of a Pb or Au layer, furthermore an insulating layers, and is characterized by being resistant to at least one of the following hazards: dust, fire, electrical leakage, heat, cold, water, and condensation.

3. The imaging apparatus and image display apparatus described in claim 2, in which the imaging apparatus and the radiation imaging apparatus are mounted on a robotic system or a drone, wherein: the display apparatus is capable of displaying a 3D structural drawing of photographed structure interiors or 3D mapping, and a current location; and the imaging apparatus and the radiation imaging apparatus, the robotic system or the drone and the wiring have a mono or multi-layered coating comprising of a Pb or Au layer, furthermore an insulating layers, and are characterized by being resistant to at least one of the following hazards: dust, fire, electrical leakage, heat, cold, water, and condensation.

4. The imaging apparatus and image display apparatus described in claim 3, further comprising a thermographic camera, wherein: the display apparatus is characterized by being capable of displaying an image and a video of the thermographic camera in combination with an image and a video obtained by the imaging apparatus and the radiation imaging apparatus, as well as being capable of recognizing abnormalities and alarms.

5. The imaging apparatus and image display apparatus described in claim 2, further comprising a thermographic camera, wherein: the display apparatus is characterized by being capable of displaying an image and a video of the thermographic camera in combination with an image and a video obtained by the imaging apparatus and the radiation imaging apparatus, as well as being capable of recognizing abnormalities and alarms.

6. The imaging apparatus and image display apparatus described in claim 1, in which the imaging apparatus and the radiation imaging apparatus are mounted on a robotic system or a drone, wherein: the display apparatus is capable of displaying a 3D structural drawing of photographed structure interiors or 3D mapping, and a current location; and the imaging apparatus and the radiation imaging apparatus, the robotic system or the drone and the wiring have a mono or multi-layered coating comprising of a Pb or Au layer, furthermore an insulating layers, and are characterized by being resistant to at least one of the following hazards: dust, fire, electrical leakage, heat, cold, water, and condensation.

7. The imaging apparatus and image display apparatus described in claim 6, further comprising a thermographic camera, wherein: the display apparatus is characterized by being capable of displaying an image and a video of the thermographic camera in combination with an image and a video obtained by the imaging apparatus and the radiation imaging apparatus, as well as being capable of recognizing abnormalities and alarms.

8. The imaging apparatus and image display apparatus described in claim 1, further comprising a thermographic camera, wherein: the display apparatus is characterized by being capable of displaying an image and a video of the thermographic camera in combination with an image and a video obtained by the imaging apparatus and the radiation imaging apparatus, as well as being capable of recognizing abnormalities and alarms.

* * * * *